United States Patent [19]

Smith

[11] Patent Number: 4,925,553
[45] Date of Patent: May 15, 1990

[54] PRESSURIZED OIL FILTER/CARBON SEPARATOR

[75] Inventor: Ernest R. Smith, Leland, Miss.

[73] Assignees: John H. Cox, III, Greenville; Charles W. Rochelle, Leland, both of Miss.; part interest to each

[21] Appl. No.: 273,062

[22] Filed: Nov. 18, 1988

[51] Int. Cl.⁵ .......................................... B01D 17/028
[52] U.S. Cl. .................................... 210/186; 210/305; 210/320; 210/456; 210/521
[58] Field of Search ............... 210/167, 168, 172, 184, 210/187, 195.1, 259, 295, 301, 305, 513, 175, 416.5, 521, 522, 532.1, 186, 258, 456, 320

[56] References Cited

U.S. PATENT DOCUMENTS

| | | | |
|---|---|---|---|
| 1,661,284 | 3/1928 | Fuqua et al. | 210/301 |
| 2,770,362 | 11/1956 | Paquin | 210/172 |
| 3,127,255 | 3/1964 | Winslow | 210/168 |
| 3,469,701 | 9/1969 | Siebenmann | 210/259 |
| 3,489,245 | 1/1970 | Broadwell | 210/168 |
| 4,159,949 | 6/1979 | Oden | 210/295 |
| 4,522,166 | 6/1985 | Toivio et al. | 210/168 |
| 4,772,401 | 9/1988 | Rawlins | 210/167 |
| 4,774,007 | 9/1988 | Gordon | 210/513 |

FOREIGN PATENT DOCUMENTS

| | | | |
|---|---|---|---|
| 1161142 | 6/1985 | Japan | 210/295 |
| 2045103 | 10/1980 | United Kingdom | 210/172 |

Primary Examiner—Frank Spear
Assistant Examiner—Joseph Drodge
Attorney, Agent, or Firm—Laubscher Presta & Laubscher

[57] ABSTRACT

A pressurized oil filter/carbon separation device includes a housing containing a plurality of separator chambers, a transfer chamber and a filter chamber. The housing includes a dirty oil inlet through which lubricating oil from an internal combustion chamber is delivered the separator chambers for serial flow therethrough. Within each chamber, carbon particles from the lubricating oil are separated from the oil flow owing to the forces of gravity within each chamber. The carbon particles are allowed to exit the lower portions of the separator chamber via discharge pipes at the bottom of the housing. From the last separator chamber, the oil is delivered to the transfer chamber for introduction into a filter chamber which contains a mesh-type filter screen to remove further minute particulates from the oil. The filtered oil exits the housing via a plurality of openings at the top of the housing and is delivered by a discharge pipe back to the internal combustion engine. A pump is provided to pressurize the oil as it passes through the filter/carbon separation device to enhance the cleaning processes of the apparatus. An oil preheater may be provided adjacent the pump to preheat the oil prior to delivery to the filter/separator housing.

6 Claims, 2 Drawing Sheets

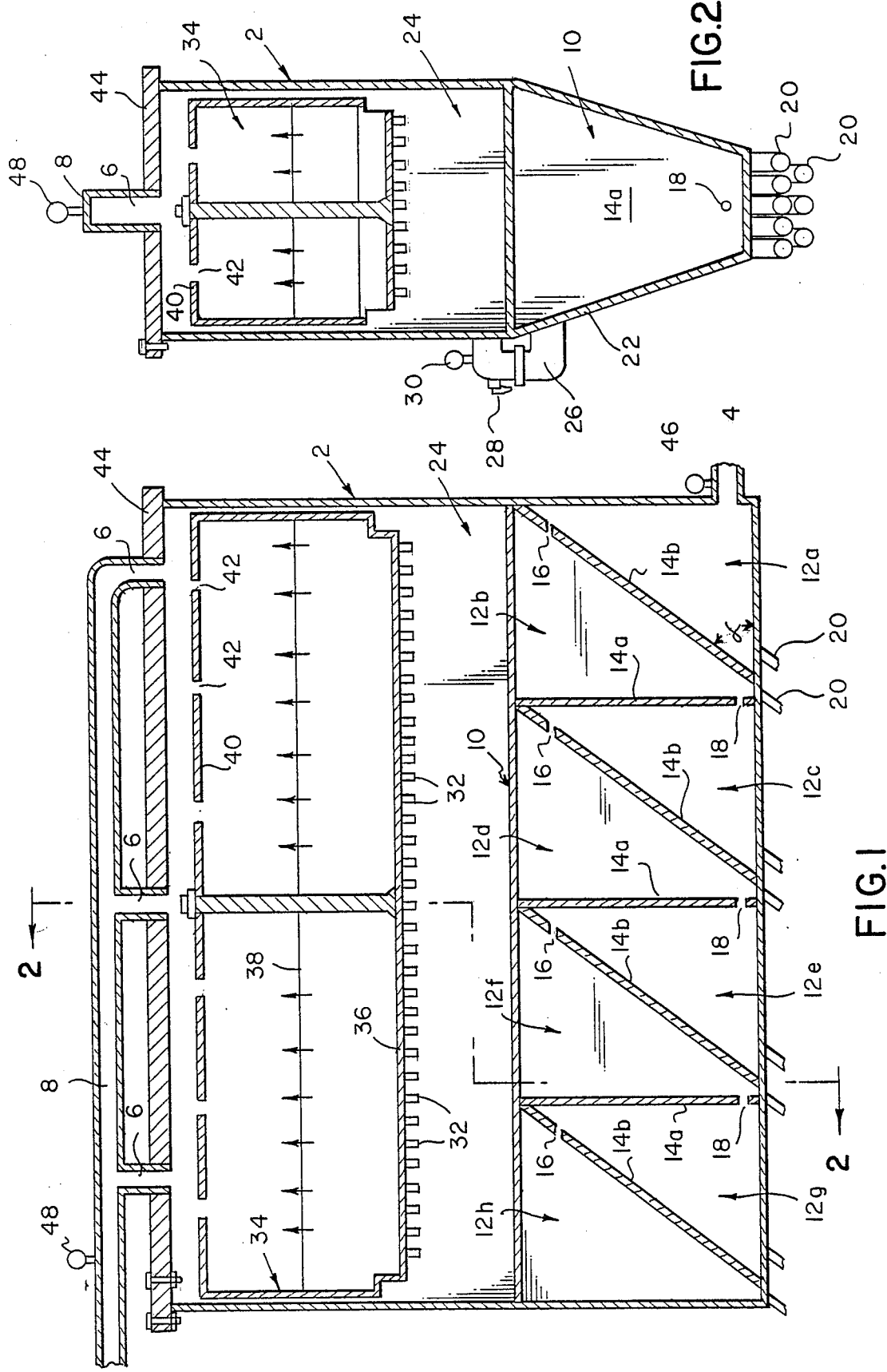

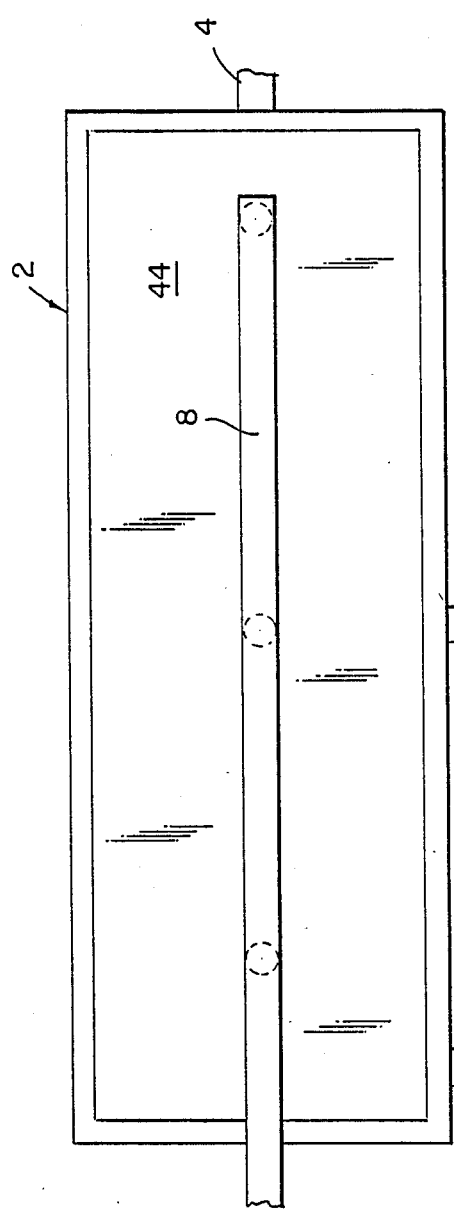
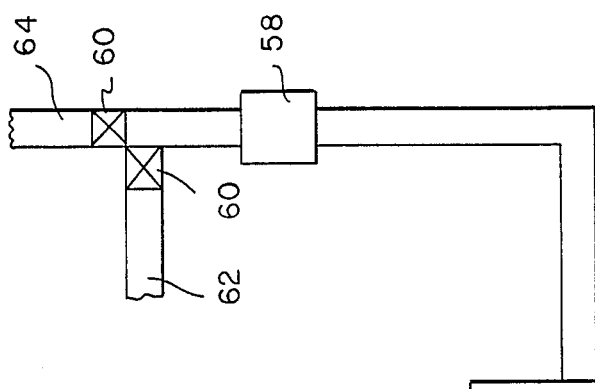
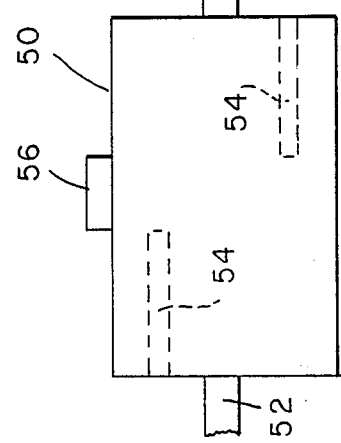
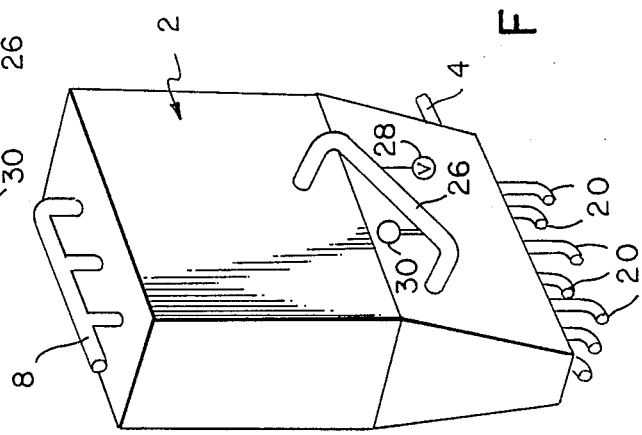

PRESSURIZED OIL FILTER/CARBON SEPARATOR

BACKGROUND OF THE INVENTION

The present invention relates to a device for separating and filtering carbon particles formed during combustion of fuel within an internal combustion engine from the lubricating oil of the engine. The device is combined with a heating apparatus for preheating the engine oil prior to starting the engine. Preheating the engine oil vastly improves starting and lubrication of the engine.

BRIEF DESCRIPTION OF THE PRIOR ART

Currently, the only filter/separator system in use for cleaning lubricating oil of an internal combustion engine includes the standard fibrous filter normally found on the engine and a centrifuge device. The oil filter is used to separate the carbon and other impurities or foreign objects and materials from engine oil as the oil is circulated through the engine during operation thereof. The centrifuge device operates independently of the engine. In these prior systems, oil is removed from the engine oil pan and filtered by the centrifugal forces generated by the operation of the centrifuge.

While the prior devices normally operated satisfactorily, they possess certain inherent drawbacks which have limited their commercial acceptability. The present invention was developed in order to overcome the drawbacks of the prior filter/separator systems for providing an apparatus of increased efficiency, less cost, and increased reliability as compared to the prior systems. Moreover, the apparatus of the present invention does not break down the valuable chemical properties of the lubricating oil during the cleansing process. It operates independently of but is used in connection with a standard oil filter and extends the life expectancy of the oil filter—as well as the engine components—immensely.

SUMMARY OF THE INVENTION

Accordingly, it is a primary object of the present invention to provide an apparatus for cleaning the oil from an internal combustion engine. The apparatus includes a housing having a dirty oil inlet and a clean oil outlet, and a pressurized oil supply which delivers a flow of dirty oil to the housing. Arranged within the housing is a gravity separating device for separating carbon particles from the lubricating oil. The separating device includes a plurality of chambers arranged in the bottom of the housing and connected in series with the housing inlet. At the bottom of each chamber is an outlet through which carbon particles, which are separated from the flow of oil by gravity, may be flushed from the housing. A filter chamber is arranged within the housing between the separation device and the housing outlet for filtering the oil following separation of carbon particles to remove further small particulates therefrom.

According to a more specific object of the invention, the separation chamber is defined by a plurality of walls containing openings arranged alternately adjacent the top and bottom of successive walls to define a serpertine flow path of oil through the separation portion of the housing.

It is yet another object of the invention to provide a transfer chamber between the separation chambers and the filter chamber. A transfer pipe is connected between an outlet from the last of the series of separation chambers and the inlet to the transfer chamber so that oil from which the carbon particles have been separated may be transported from the separation chambers to the transfer chamber.

The filter chamber contains a plurality of openings in the lower wall portion thereof through which oil enters the filter chamber from the transfer chamber. Arranged within the filter chamber is a mesh filter screen which removes additional particulates from the pressurized flow of oil.

According to yet another object of the invention, the source of pressurized oil includes a pump for delivering the oil to the separator/filter housing and a preheating device operable independently of the separator/filter housing for heating the engine oil prior to starting the engine to improve engine lubrication and starting.

BRIEF DESCRIPTION OF THE FIGURES

Other objects and advantages of the present invention will become apparent from a study of the following specification when viewed in the light of the accompanying drawing in which:

FIG. 1 is a front sectional view of the pressurized oil filter/carbon separation device according to the invention;

FIG. 2 is a sectional end view of the device of FIG. 1 taken along line 2—2;

FIG. 3 is a top plan view of the device of FIG. 1;

FIG. 4 is a perspective view of the oil filter/carbon separation device of FIG. 1; and FIG. 5 is a schematic view of the oil preheating device and pump assembly for providing a pressurized flow of oil to the device of FIGS. 1–4.

DETAILED DESCRIPTION

Referring first to FIGS. 1–4, the pressurized oil filter/carbon separator according to the invention will be described. The device is suitable for use in connection with an internal combustion engine for cleaning the lubrication oil from the engine. Typically, the engine has an oil capacity on the order of 150 gallons and the oil filter/carbon separator of the invention is suitable for continuously cleaning carbon deposits and particulates from the lubrication oil which result from the combustion process.

The device includes a housing 2 having a lower dirty oil inlet 4 and a plurality of upper clean oil outlets 6. The outlets are connected with a discharge pipe 8, whereby oil that has been cleaned may be returned to the internal combustion engine.

Dirty oil is delivered under pressure to the inlet 4 at the bottom of the housing and enters a gravity-type separation device 10 arranged in the lower portion of the housing. As shown in FIG. 2, the housing lower portion is tapered toward the bottom of the housing to assist in gravity separation. More particularly, the gravity-type separation device 10 includes a plurality of chambers which are connected in series with the housing inlet 4.

In FIG. 1, there are shown eight separator chambers 12a–12h, the chambers being defined by a plurality of chamber walls 14. The chamber walls 14 are divided into alternating groups of walls 14a and 14b, the walls 14a being arranged generally perpendicular to the bottom wall of the housing and the walls 14b being arranged at an acute angle α relative to the housing bottom wall. The inclined walls 14b contain an opening 16 adjacent the top portion thereof, and the perpendicular walls 14a contain an opening 18 adjacent the bottom portion thereof.

Owing to the openings 16 and 18 in the respective inclined and perpendicular walls, oil to be cleansed is transported successively through the chambers 12a, 12b . . . 12h via a serpentine flow path. Thus, as the oil pressure builds, the oil will flow from one separator chamber into the next through the openings in the chamber walls. This will define a continuous flow of oil until the oil has reached the last chamber 12h. While the oil is in the various separator chambers, carbon particles flow toward the bottom of each chamber due to gravitational forces within the pressurized fluid. Furthermore, owing to the inclined walls 14b, particles are also directed toward the bottom of each chamber as a result of the flow currents generated therein. At the bottom of each chamber, there is provided an outlet opening 20 which affords an exit for carbon particles which have been separated from the oil flow and which are collected in the bottom portion of each chamber. From the openings 20, the carbon deposits are flushed or evacuated from the lower portion of the housing 2.

The last separator chamber 12h contains an opening 22 adjacent the top portion thereof for delivering oil from which the carbon particles have been separated to a transfer chamber 24. More particularly, as shown in FIGS. 2, 3 and 4, the outlet opening 22 of the last separator chamber 12h is connected with a transfer pipe 26 which transfers filtered oil from the gravity separation device 10 in the lower portion of the housing to the transfer chamber 24 arranged in the middle, intermediate portion of the housing. A valve 28 and a pressure gauge 30 are arranged in the transfer pipe 26 to provide an indication of the oil pressure within the pipe and to control the flow of oil therethrough.

Within the transfer chamber 24, the oil is evenly distributed across the intermediate portion of the housing. From the transfer chamber, oil under pressure is forced upwardly through a plurality of openings 32 into an upper filter chamber 34 arranged above the transfer chamber 24. Owing to the plurality of openings 32 in the bottom wall 36 of the transfer chamber 34, oil is evenly distributed across the entire lower portion of the filter chamber 34. Because the oil is under pressure, it flows upwardly through a mesh filter screen 38 arranged horizontally within the filter chamber 34. The filter screen 38 is formed of a conventional material such as non-corrosive brass having a plurality of suitably sized openings for filtering small particulates from the pressurized oil flow. The top wall 40 of the transfer chamber 34 contains a plurality of openings 42 through which filtered oil passes upwardly to the top of the housing. The housing top wall 44 contains the clean oil outlets 6, whereby the filtered oil exits the chamber for recirculation to the internal combustion engine.

Pressure gauges 46 and 48 are provided adjacent the inlet 4 and the discharge pipe 8, respectively of the housing to assist in monitoring the pressure of the oil flow through the pressurized oil flow filter/separator housing.

Referring now to FIG. 5, there is shown an assembly for providing oil under pressure to the apparatus shown in FIGS. 1-4. More particularly, a heating chamber 50 is provided having an inlet 52 which is connected with the oil pan of the internal combustion engine. Arranged within the heating chamber 50 are a plurality of heating devices 54, such as electrical resistance heaters, for preheating oil contained within the chamber 50. A thermostat 56 is provided to control the temperature of the chamber 50. From the preheating device 50, oil is delivered to a pump 58 which is used to pressurize the oil for delivery to the housing 2 shown in FIGS. 1-4. The pump creates a pulsating pressure which aids the filtering process. At the outlet of the pump, there are provided two oil outlet conduits both of which contain bypass valves 60. Operation of the valves 60 is suitable for directing the flow of oil to either the engine via an outlet pipe 62 to prelubricate the engine prior to starting, or to the filter/separator housing 2 via an outlet 64. The oil preheating assembly shown in FIG. 5 serves two purposes. First, it can be used to heat the oil prior to engine start-up and as an aid to to pre-lubricating the engine by delivering heated oil via the outlet 62. Secondly, the pre-heating assembly can be used to heat the oil prior to use in the filtering process but while the internal combustion engine is not running.

The pressurized oil filter/carbon separator device according to the invention can be independently mounted by a bracket to or near the internal combustion engine whose oil is being cleaned. Although the filter/separation system operates continuously while the engine is running, it may also operate independently while the engine is turned off. Periodically, the outlet tubes 20 connected with the bottom of the separator chambers are emptied by simple operation of a valve (not shown). These tubes will be under approximately the same pressure as shown at the inlet gauge 46 to the separator.

While in accordance with the provisions of the patent statute the preferred forms and embodiments of the invention have been illustrated and described, it will be apparent to those skilled in the art that various changes and modifications may be made without deviating from the inventive concepts set forth above.

What is claimed is:

1. Apparatus for cleaning lubricating oil from an internal combustion engine, comprising:

(a) a housing including a dirty oil inlet and a clean oil outlet;

(b) means for supplying a pressurized flow of oil to said housing inlet;

(c) gravity separation means located within said housing and arranged adjacent a bottom wall thereof, said separation means including a plurality of walls connected with said housing bottom wall, said walls comprising successive alternating normal and acutely angled walls relative to said bottom wall defining a plurality of chambers connected in series with said housing oil inlet, each of said walls containing an opening affording flow of oil successively through said chambers, said openings being provided adjacent the top and bottom of successive walls, respectively, whereby oil flows through said separation means in a serpentine path, each of said chambers having an outlet in said housing bottom wall through which carbon particles which become separated from the oil flow owing to gravity may exit the housing; and (d) filter means located within said housing between said separation means and said housing outlet for filtering the oil following separation of carbon particles to remove further small particulates therefrom.

2. Apparatus as defined in claim 1, and further comprising transfer means connected between said separation means and said filter means.

3. Apparatus as defined in claim 2, wherein said transfer means comprises a transfer chamber arranged between said separation chambers and said filter means, said filter means being located in the upper portion of said housing.

4. Apparatus as defined in claim 3, wherein said transfer means further comprises a transfer pipe connected between the last of said series of separation chambers and said transfer chamber for transporting oil from said separation means to said transfer chamber.

5. Apparatus as defined in claim 4, wherein said filter means comprises
   (a) a filter chamber having a plurality of inlets communicating with said transfer chamber and a plurality of outlets communicating with said housing outlet; and
   (b) at least one filter screen arranged in said filter chamber through which the pressurized oil passes to filter impurities therefrom.

6. Apparatus as defined in claim 1, wherein said means for supplying a pressurized flow of oil include
   (1) a pump; and
   (2) means for heating the oil, whereby the oil is heated prior to starting the engine to improve engine lubriation and starting.

* * * * *